United States Patent Office 2,915,483
Patented Dec. 1, 1959

2,915,483

PLASTICIZED PERFLUOROCHLOROETHYLENE POLYMER AND PROCESS FOR PREPARING POROUS ARTICLES THEREFROM

William S. Barnhart, Cranford, N.J., assignor, by mesne assignments, to Minnesota Mining and Manufacturing Company, St. Paul, Minn., a corporation of Delaware No Drawing. Application December 30, 1953
Serial No. 401,379

16 Claims. (Cl. 260—2.5)

This invention relates to the modification of perfluorochloroolefin polymers. In one of its aspects, this invention relates to novel perfluorochloroolefin compositions. In another of its aspects, this invention relates to a process for modifying the polyperfluorochloroolefins. In another of its aspects, this invention relates to a process for preparing porous polyperfluorochloroolefin articles. In one of its more particular aspects, this invention relates to the modification of trifluorochloroethylene polymers and to the preparation of porous trifluorochlroethylene polymer materials.

Perfluorochloroolefin polymers, such as polymers of trifluorochloroethylene, have been polymerized to yield normally solid thermoplastic polymers. To extend the utility of these polymers, their properties have been modified by adding quantities of low molecular weight distillable perfluorochloroolefin polymers. For example, normally solid polytrifluorochloroethylene has been plasticized with a distillable polymer of trifluorochloroethylene prepared by thermally cracking the solid polymer of trifluorochloroethylene, while in my copending application, filed of even date, the plasticization of the perfluorochloroolefin polymers employing telomeric plasticizers is described. However, the maximum amount of thermally cracked plasticizer that can be incorporated in a solid perfluorochloroolefin polymer is about 35% while the maximum amount of plasticizer produced by the telomerization process that can be incorporated is about 45%. Thus, the range of perfluorochloroolefin polymeric articles which can be fabricated, is limited by the amount of plasticizer or modifying agent which can be incorporated in the solid polymer.

It is an object of this invention, to provide a modifier for the perfluorochloroolefin polymers which is more compatible than previously available modifiers.

It is another object of this invention, to provide a modifier which improves the drape and flex characteristics of the polymer.

It is another object of this invention, to provide a process for modifying the perfluorochloroolefin polymers.

It is still another object of this invention, to provide a process for preparing porous perfluorochloroolefin articles.

Various other objects and advantages of the present invention may become apparent to those skilled in the art on reading the accompanying description and disclosure.

Generally, the above objects are accomplished by admixing with the perfluorochloroolefin polymer that is to be modified, a quantity of a distillable polymer of trifluorochloroethylene which has a broad molecular weight range.

As indicated previously, the maximum amount of distillable polymer of trifluorochloroethylene which could be incorporated in a thermoplastic perfluorochloroolefin polymer was about 35% in the case of polymer produced by a thermal cracking process, and about 45% in the case of polymer produced by the telomerization process. It has now been found that by carefully adjusting the molecular weight range and distribution of the distillable polymer the compatibility is improved. The adjustment is accomplished by increasing the percentage of high molecular weight material in the modifier, as discussed in detail below.

The distillable polymers which may be used in the process of this invention, comprise the polyperfluorochloroolefins, such as polytrifluorochloroethylene, produced by thermally cracking the normally solid perfluorochloroolefin polymer or by telomerizing a perfluorochloroolefin in the presence of a telomerization agent or telogen, such as a sulfuryl halide. The preparation of distillable polymer by the cracking process is described in U.S. Patent No. 2,636,907, issued April 28, 1953, to W. T. Miller and the preparation of the telomeric modifiers of this invention is described in my copending applications S.N. 294,495, filed June 19, 1952 now U.S. Patent No. 2,770,659 and S.N. 342,743, filed March 16, 1953, now U.S. Patent No. 2,837,580.

While this invention contemplates the use of polymer produced by the thermal cracking process or by the telomerization process, it should be noted that there are significant differences between the products of these processes. Thus, telomeric product of this disclosure has an even number of carbon atoms and halogen terminal groups depending on the telogen employed. Since sulfuryl chloride is usually employed, the halogen groups of the telomer will be chlorine. Polymer produced by the thermal cracking process has a random number of carbon atoms and no single identifiable species. The end groups on the cracked polymer are unknown but are believed to be fluorine. The halogen composition of cracked polymer is chlorine 29.3%, fluorine 49.2% which composition does not vary by more than about 1%. The differences between telomer and cracked product show up most markedly in the formulations in which they are used. Thus, the normal telomeric plasticizers are more compatible than the normal cracked plasticizers. This difference is observable with respect to the modified plasticizers of this invention. Thus, the modified telomeric plasticizer may be added to the solid thermoplastic polymer in an amount up to about 85%, whereas the modified cracked plasticizer is not compatible in quantities exceeding about 75 weight percent. In addition, the modified telomers when added to a normally solid plastic, produce a product which has better low temperature characteristics, which is not hazy, and which does not bleed even under the most adverse conditions. The use of the modified telomers is therefore preferred.

The telomeric plasticizers of this invention, are prepared by telomerization in the presence of a sulfuryl halide and have the general formula $W-(X)_n-W$ wherein W is a member selected from the group consisting of fluorine, chlorine and bromine, (X) is a halo-olefinic, preferably haloethylenic monomer unit and n is an integer greater than one preferably at least 4 and preferably not more than 20.

The reaction occurs essentially as shown below in a typical reaction using chlorotrifluoroethylene and sulfuryl chloride as an example:

$$nCF_2=CFCl + SO_2Cl_2 \rightarrow SO_2 + Cl-(CF_2-CFCl)_n-Cl$$

As shown, sulfur dioxide gas is formed as well as a clear polymeric mass, usually in gel-like form, which includes various grades of telomeric halocarbons, such as liquids, oils, greases and soft waxes. These telomeric halocarbons may be separated by conventional distillation. The distillable substances obtained by telomerizing chlorotrifluoroethylenic compounds in the presence of sulfuryl chloride are sufficiently stable so as not to absorb appreciable amounts of fluorine even though exposed to the gas for 24 hours at a temperature of 60° C. or to significantly pyrolytically decompose at temperatures up to 200° C.

This invention also contemplates the use of co-telomers of perfluorochloroolefins co-telomerized with other halogenated olefins, such as tetrafluoroethylene, vinyl chloride, vinylidene chloride, vinyl fluoride, vinylidene fluoride, etc. These co-telomers have the general formula $W—(X)_n(Y)_m—W$, wherein W is a member selected from the group consisting of fluorine, chlorine and bromine, X and Y are different halo-olefinic, preferably ethylenic, monomer units and $n$ and $m$ are integers and preferably each is greater than one and each is not greater than 10.

A more detailed description of the process of preparing telomeric compounds may be found in my copending applications as discussed above. However, a pertinent example is presented below;

Example 1. *Telomerization of chlorotrifluoroethylene*

The pressure system was flushed out with nitrogen and charged with a peroxide solution (3.5 parts of benzoyl peroxide dissolved in 308 parts of carbon tetrachloride) and 135 parts of sulfuryl chloride. The system was cooled to about −25° C. or lower and 116 parts of chlorotrifluoroethylene monomer was added. The system was closed and heated to about 95° C. for a period of four hours during which time the mixture was mechanically agitated. A maximum gage pressure of 300 pounds per square inch was reached and then gradually subsided. At the end of the the telomerization the gases were bled from the system and the liquid product was transferred to a distilling pot. The excess sulfuryl chloride and carbon tetrachloride (solvent) were boiled off by heating the mixture to a pot temperature of 165° C. at atmospheric pressure. The gel-like product was distilled at a vapor temperature up to 175° C. at 35 mm. of mercury to remove very low molecular weight polymers. Final distillation was conducted at 0.5 mm. pressure and at a vapor temperature up to about 230° C. The telomerization yield was 78 percent with 93 percent of the product distilled.

The molecular weight range of the distillable polymers produced by cracking solid polymer or by telomerizing the monomer is fairly broad. However, the average distribution is not satisfactory for the purposes of this invention and must be adjusted. This is accomplished by fractionating the distillable polymer and subsequently admixing the fractions in the proper proportion. The fractions which are employed in preparing the modifiers or plasticizers of this invention, are the normally liquid polymers which have a boiling range between about 300° C. and about 450° C. at atmospheric pressure and the wax-like residue which boils above about 450° C. These waxes are best characterized by their melting point which is between about 75° C. and about 125° C.

In preparing the modifiers of this invention, between about 30% and about 80% of the wax-like residue is added to the normally liquid polymer. When less than 30% of the wax is used, the solubility of the wax-liquid modifier is materially diminished, i.e. the compatibility with solid polyperfluorochloroolefin polymers is greatly reduced, whereas when more than 80% of wax is added to the liquid, desirable characteristics such as flexibility are lost. Preferably, the amount of wax which is added to the liquid polymer is between about 40 and about 70 weight percent, while still more preferably approximately equal quantities of wax and oil are used, that is between about 45 and about 55 weight percent of wax is added to the liquid polymer to be incorporated in the solid polyperfluorochloroolefin polymer.

The normally solid non-distillable polymers which may be plasticized by the process of this invention are the polymers of perfluorochloroolefins, such as trifluorochloroethylene, dichlorofluoroethylene (symmetrical and unsymmetrical), trichlorofluoroethylene, and copolymers of the above perfluorochloroolefins copolymerized with not more than 5 mol percent of other halogenated olefins, such as vinyl fluoride, vinylidene fluoride, vinyl chloride, vinylidene fluoride, vinyl chloride, vinylidene chloride, and trichloroethylene. The normally solid polymers are not distillable and are best characterized by reference to their no strength temperature. The N.S.T. of the solid polymer should be at least 220° C. and preferably above about 300° C. The higher N.S.T. polymer is preferred because it will possess high strength characteristics even though plasticized with an unusually high amount of plasticizer.

The amount of normally solid polymer which is used in preparing the modified compositions of this invention may vary over relatively wide limits. However, when more than about 50% of the normally solid polymer is present, the extensible characteristics are lost and the composition approaches that of an ordinary plasticized polymer, whereas when less than about 15% of normally solid polymer, 25% when cracked plasticizer is used, is present desirable strength characteristics are lost. A suitable quantity of solid non-distillable polymer which may be admixed with the modified telomer of this invention is between about 15 and about 50 weight percent; the quantity which is admixed with the cracked polymers is between about 25 and about 50 weight percent. Preferably, in order to secure the advantages of extensibility and high strength, between about 25 and about 40 weight percent of normally solid polymer is employed.

The unusual characteristics of the modified solid polymers of this invention make them useful in a wide variety of applications. Because of their unusual flexibility they may be used in packaging irregular objects or as linings for tanks of irregular shape or in general for any other use to which a highly extensible material may be put. In another embodiment of this invention, the plasticizer may be extracted from the fabricated item to leave a highly porous solid polymer. Any suitable solvent for the plasticizer may be employed, such as acetone, methyl ethyl ketone, cyclohexanone, etc. These highly porous materials are useful as battery separators, filter media, etc.

Preparation of the modified plasticizers, incorporation of the plasticizer into a solid polymer, and fabrication of the modified solid polymer into useful end items may be accomplished by employing suitable techniques. Thus, the liquid and wax fractions may be blended in a ball mill, a three roll mill, or other suitable mill. In like manner, the solid polymer may be admixed with the modified plasticizer in a ball mill, ribbon blender, or other suitable mill while molding of the modified or plasticized polymer may be effected in suitable molding equipment employing temperatures between about 212° C. and about 330° C. and at a pressure between about 500 and 2500 pounds per square inch.

In order to illustrate the process of this invention, the following examples, which are offered for purposes of illustration and which are not to be construed as unnecessarily limiting, are presented below.

EXAMPLE I

Equal quantities of a homopolymer of trifluorochloroethylene (N.S.T. about 300° C.) solid polytrifluorochloroethylene wax (melting point above 95° C.) and normally liquid polytrifluorochloroethylene (boiling point between 300° C. and 450° C. at atmospheric pressure) were admixed in a ball mill. The liquid and wax were produced by telomerizing with sulfuryl chloride. Films were hot pressed from this composition at a temperature of about 200° C. and a pressure of about 1,000 pounds. The films possessed amazing strength and showed excellent drape, elasticity and extensibility. Film strips were cold drawn over 500 percent at room temperature.

EXAMPLE II

A film prepared as in Example I was extracted with methyl ethyl ketone. Approximately 95% of the plasticizer was removed. The residue of the extraction was a highly porous polytrifluorochloroethylene film and has functioned successfully as a battery separator and as a filter media.

EXAMPLE III

Approximately 40 weight percent of a solid homopolymer of trifluorochloroethylene (N.S.T. about 300° C.), approximately 30 weight percent of normal telomeric plasticizer boiling above about 300° C. and containing about 15 percent of telomer wax and approximately 30 weight percent of a telomer wax having a melting point of about 95° C. were admixed in a ball mill. Films were hot pressed from this composition at a temperature of about 200° F. and a pressure of about 1000 pounds. These films possessed the same characteristics as the films in Example I.

EXAMPLE IV

The following ingredients were admixed in a ball mill.

| | Weight percent |
|---|---|
| Homopolymer of trifluorochloroethylene (about 300 N.S.T.) | 40 |
| Telomer wax (melting point about 95%) | 30 |
| Telomer oil (boiling point about 350° C. to 400° C.) | 15 |
| Telomer oil (boiling point about 400° C. to 450° C.) | 15 |

Films were hot pressed from this composition using the process of Example I. These films also possessed remarkable strength and showed excellent drape, elasticity and extensibility.

EXAMPLE V

In order to demonstrate the effectiveness of the novel composition of this invention, an attempt was made to incorporate a high percentage of normal telomer oil in a solid homopolymer of trifluorochloroethylene. Thus, approximately 50 percent of a normally solid homopolymer of trifluorochloroethylene (N.S.T. about 300) was admixed with approximately 50 weight percent of normal telomer oil which contained approximately 15 weight percent of telomer wax. Films were pressed from this composition as in Example I. These films exude plasticizer and do not possess the drape, elasticity and extensibility of the films which were prepared using the modified telomer composition of this invention.

Various alterations and modification of the invention and its aspects may become apparent to those skilled in the art without departing from the scope of this invention.

Having thus described my invention, I claim:

1. A process for preparing porous perfluorochloroethylene polymer articles which comprises admixing between about 25 and about 50 weight percent of a normally solid perfluorochloroethylene polymer with a distillable perfluorochloroethylene polymer which consists essentially of an admixture of between about 30 and about 80 weight percent of a waxy perfluorochloroethylene polymer having a melting point between about 75° C. and about 125° C. and a normally liquid perfluorochloroethylene polymer having a boiling range between about 300° C. and about 450° C. at atmospheric pressure, molding said admixture at a temperature between about 212° C. and about 330° C. and a pressure between about 500 and about 2500 pounds per square inch and extracting the distillable perfluorochloroethylene polymer with a suitable solvent.

2. The process of claim 1 wherein the solvent is acetone.

3. The process of claim 1 wherein the solvent is methyl ethyl ketone.

4. The process of claim 1 wherein the solvent is cyclohexanone.

5. A process for preparing porous trifluorochloroethylene polymer articles which comprises admixing between about 15 and about 50 weight percent of a normally solid polymer of trifluorochloroethylene having an N.S.T. above about 220 with a distillable telomer of trifluorochloroethylene having a plurality of trifluorochloroethylene monomer units and chlorine terminal groups which consists essentially of an admixture of between about 30 and about 80 weight percent of a waxy trifluorochloroethylene telomer having a melting point between about 75° C. and about 125° C. and a normally liquid trifluorochloroethylene telomer boiling between about 300° C. and about 450° C. at atmospheric pressure, molding said admixture at a temperature between about 212° C. and about 330° C. and a pressure between about 500 and about 2500 pounds per square inch and extracting the distillable trifluorochloroethylene telomer with a suitable solvent.

6. A process for preparing porous trifluorochloroethylene polymer articles which comprises admixing between about 25 and about 50 weight percent of a normally solid polymer of trifluorochloroethylene having an N.S.T. above about 220 with a distillable polymer of trifluorochloroethylene produced by thermally cracking solid polymer which consists essentially of an admixture of between about 30 and about 80 weight percent of a waxy polymer of trifluorochloroethylene having a melting point between about 75° C. and about 125° C. and a liquid polymer boiling between about 330° C. and about 450° C. at atmospheric pressure, molding said admixture at a temperature between about 212° C. and about 330° C. and a pressure between about 500 and about 2500 pounds per square inch and extracting the distillable trifluorochloroethylene polymer with a suitable solvent.

7. A novel plasticized composition which comprises a normally solid trifluorochloroethylene polymer admixed with a trifluorochloroethylene polymer produced by thermally cracking solid trifluorochloroethylene polymer, said polymer admixture consisting essentially of between about 25 to about 50 weight percent of said normally solid trifluorochloroethylene polymer and correspondingly between about 75 and about 50 weight percent of said thermally cracked trifluorochloroethylene polymer, said thermally cracked trifluorochloroethylene polymer consisting essentially of between about 30 and about 80 weight percent of a waxy trifluorochloroethylene polymer having a melting point between about 75° C. and about 125° C. and correspondingly between about 70 and about 20 weight percent of a normally liquid trifluorochloroethylene polymer having a boiling range between about 300° C. and about 450° C. at atmospheric pressure.

8. A novel plasticized composition which comprises a normally solid perfluorochloroethylene polymer admixed with a trifluorochloroethylene polymer, said polymer admixture consisting essentially of between about 15 and about 50 weight percent of said normally solid perfluorochloroethylene polymer and correspondingly between about 85 and about 50 weight percent of said trifluorochloroethylene polymer, said trifluorochloroethylene polymer consisting essentially of between about 30 and about 80 weight percent of a waxy trifluorochloroethylene polymer having a melting point between about 75° C. and about 125° C. and correspondingly between about 70 and about 20 weight percent of a normally liquid trifluorochloroethylene polymer having a boiling range between about 300° C. and about 450° C. at atmospheric pressure.

9. A novel plasticized composition which comprises a normally solid trifluorochloroethylene polymer admixed with a trifluorochloroethylene telomer having a plurality of trifluorochloroethylene monomer units and chlorine terminal groups, said polymer admixture consisting essentially of between about 15 and about 50 weight percent of said normally solid trifluorochloroethylene polymer and correspondingly between about 85 and about 50 weight percent of said trifluorochloroethylene telomer, said telomer consisting essentially of between about 30 and about 80 weight percent of a waxy trifluorochloroethylene telomer having a melting point between about 75° C. and about 125° C. and correspondingly between about 70 and about 20 weight percent of a normally liquid trifluorochloroethylene telomer boiling between about 300° C. and about 450° C. at atmospheric pressure.

10. A novel plasticized composition which comprises a normally solid perfluorochloroethylene polymer admixed with a trifluorochloroethylene polymer, said polymer admixture consisting essentially of between about 25 and about 50 weight percent of said normally solid perfluorochloroethylene polymer and correspondingly between about 75 and about 50 weight percent of said trifluorochlorethylene polymer, said trifluorochloroethylene polymer consisting essentially of between about 30 and about 80 weight percent of a waxy trifluorochloroethylene polymer having a melting point between about 75° C. and about 125° C. and correspondingly between about 70 and about 20 weight percent of a normally liquid trifluorochloroethylene polymer having a boiling range between about 300° C. and about 450° C. at atmospheric pressure.

11. A novel plasticized composition which comprises a normally solid polymer of trifluorochloroethylene having a N.S.T. above about 220° C. admixed with a polymer of trifluorochloroethylene, said polymer admixture consisting essentially of between about 25 and about 50 weight percent of said normally solid polymer of trifluorochloroethylene having a N.S.T. above about 220° C. and correspondingly between about 75 and about 50 weight percent of said polymer of trifluorochloroethylene, the latter of which consists essentially of between about 30 and about 80 weight percent of a waxy polymer of trifluorochloroethylene having a melting point between about 75° C. and about 125° C. and correspondingly between about 70 and about 20 weight percent of a liquid polymer boiling between about 300° C. and about 450° C. at atmospheric pressure.

12. A novel plasticized composition which comprises a normally solid polymer of trifluorochloroethylene having a N.S.T. above about 220° C. admixed with a telomer of trifluorochloroethylene having a plurality of trifluorochloroethylene monomer units and chlorine terminal groups, said polymer admixture consisting essentially of between about 15 and about 50 weight percent of said normally solid polymer of trifluorochloroethylene having a N.S.T. above about 220° C. and correspondingly between about 85 and about 50 weight percent of said telomer of trifluorochloroethylene, said telomer consisting essentially of between about 30 and about 80 weight percent of a waxy trifluorochloroethylene telomer having a melting point between about 75° C. and about 125° C. and correspondingly between about 70 and about 20 weight percent of a normally liquid trifluorochloroethylene telomer boiling between about 300° C. and about 450° C. at atmospheric pressure.

13. A novel plasticized composition which comprises a normally solid polymer of trifluorochloroethylene having a N.S.T. above about 300° C. admixed with a telomer of trifluorochloroethylene having a plurality of trifluorochloroethylene monomer units and chlorine terminal groups, said polymer admixture consisting essentially of between about 15 and about 50 weight percent of said normally solid polymer of trifluorochloroethylene having a N.S.T. above about 300° C. and correspondingly between about 85 and about 50 weight percent of said telomer of trifluorochloroethylene, said telomer consisting essentially of between about 40 and about 70 weight percent of a waxy trifluorochloroethylene telomer having a melting point between about 75° C. and about 125° C. and correspondingly between about 60 and about 30 weight percent of a normally liquid trifluorochloroethylene telomer boiling between about 300° C. and about 450° C. at atmospheric pressure.

14. A novel plasticized composition which comprises a normally solid polymer of trifluorochloroethylene having a N.S.T. above about 300° C. admixed with a telomer of trifluorochloroethylene having a plurality of trifluorochloroethylene monomer units and chlorine terminal groups, said polymer admixture consisting essentially of between about 25 and about 40 weight percent of said normally solid polymer of trifluorochloroethylene having a N.S.T. above about 300° C. and correspondingly between about 75 and about 60 weight percent of said telomer of trifluorochloroethylene, said telomer consisting essentially of between about 45 and about 50 weight percent of a waxy trifluorochloroethylene telomer having a melting point between about 75° C. and about 125° C. and correspondingly between about 55 and about 50 weight percent of a normally liquid trifluorochloroethylene telomer boiling between about 300° C. and about 450° C. at atmospheric pressure.

15. A novel plasticized composition which comprises a normally solid polymer of trifluorochloroethylene having a N.S.T. above about 220° C. admixed with a polymer of trifluorochloroethylene produced by thermally cracking solid polymer, said polymer admixture consisting essentially of between about 25 and about 50 weight percent of said normally solid polymer of trifluorochloroethylene having a N.S.T. above about 220° C. and correspondingly between about 75 and about 50 weight percent of said thermally cracked polymer, said thermally cracked polymer consisting essentially of between about 30 and about 80 weight percent of a waxy polymer of trifluorochloroethylene having a melting point between about 75° C. and about 125° C. and correspondingly between about 70 and about 20 weight percent of a liquid polymer boiling between about 300° C. and about 450° C. at atmospheric pressure.

16. A novel plasticized composition which comprises a normally solid polymer of trifluorochloroethylene having a N.S.T. above about 300° C. admixed with a polymer of trifluorochloroethylene produced by thermally cracking solid polymer, said polymer admixture consisting essentially of between about 25 and about 40 weight percent of said normally solid polymer of trifluorochloroethylene having a N.S.T. above about 300° C. and correspondingly between about 75 and about 60 weight percent of said thermally cracked polymer, said thermally cracked polymer consisting essentially of between about 40 and about 70 weight percent of a waxy polymer of trifluorochloroethylene having a melting point between about 75° C. and about 125° C. and correspondingly between about 60 and about 30 weight percent of a liquid polymer boiling between about 300° C. and about 450° C. at atmospheric pressure.

References Cited in the file of this patent

UNITED STATES PATENTS

| | | |
|---|---|---|
| 2,573,639 | Coler | Oct. 30, 1951 |
| 2,600,802 | Passino | June 17, 1952 |
| 2,775,569 | Dipner et al. | Dec. 25, 1956 |

OTHER REFERENCES

India Rubber World (July 1950), page 437.

UNITED STATES PATENT OFFICE

CERTIFICATE OF CORRECTION

Patent No. 2,915,483            December 1, 1959

William S. Barnhart

It is hereby certified that error appears in the printed specification of the above numbered patent requiring correction and that the said Letters Patent should read as corrected below.

Column 4, lines 4 and 5, strike out "vinylidene fluoride, vinyl chloride,"; column 6, line 33, for "330° C." read -- 300° C. --.

Signed and sealed this 24th day of May 1960.

(SEAL)
Attest:

KARL H. AXLINE
Attesting Officer

ROBERT C. WATSON
Commissioner of Patents